June 24, 1924.
J. L. SPURGEON
1,498,584
LAWN MOWER CUTTING REEL SHARPENER
Filed Oct. 8, 1923   2 Sheets-Sheet 1
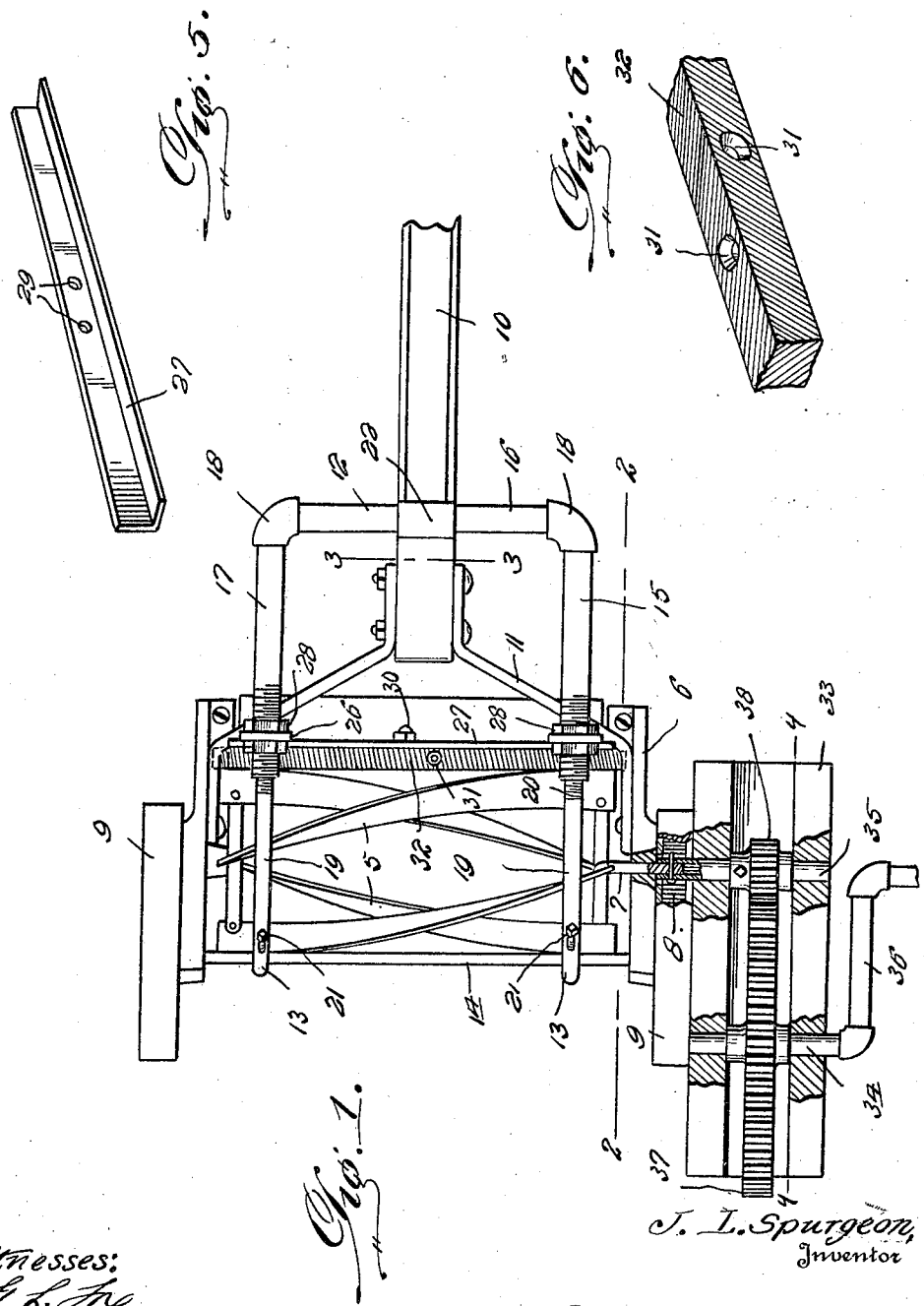

June 24, 1924.
J. L. SPURGEON
1,498,584
LAWN MOWER CUTTING REEL SHARPENER
Filed Oct. 8, 1923
2 Sheets-Sheet 2
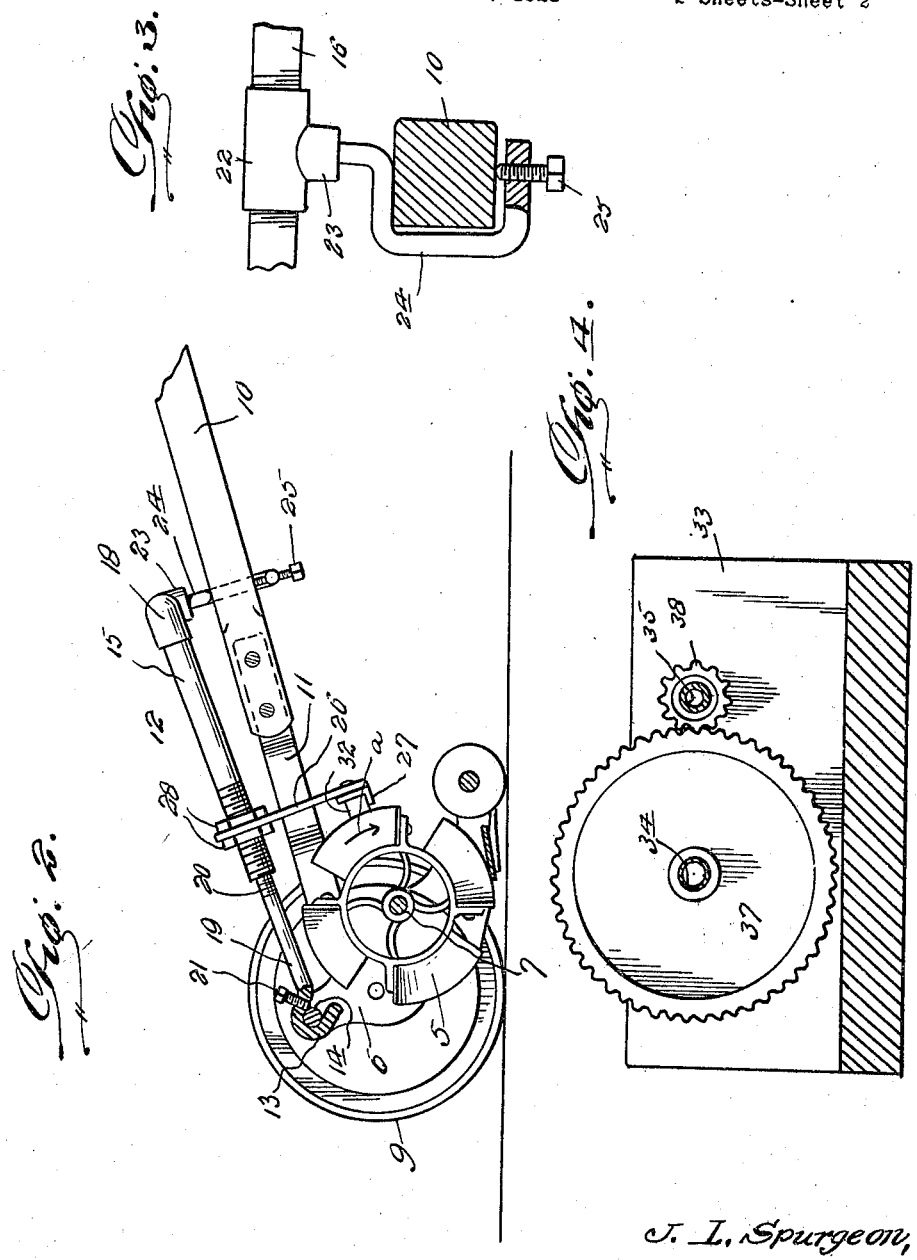
J. L. Spurgeon,
Inventor Patented June 24, 1924.

1,498,584

UNITED STATES PATENT OFFICE.

JOHN L. SPURGEON, OF LAKE CITY, IOWA.

LAWN-MOWER CUTTING-REEL SHARPENER.

Application filed October 8, 1923. Serial No. 667,315.

*To all whom it may concern:*

Be it known that I, JOHN L. SPURGEON, citizen of the United States, residing at Lake City, in the county of Calhoun and State of Iowa, have invented certain new and useful Improvements in Lawn-Mower Cutting-Reel Sharpeners, of which the following is a specification.

This invention relates to sharpening devices for the rotating cutting reel of lawn mowers and is of that type wherein means is provided for supporting a sharpening element in position to sharpen the knives of the cutting reel when the latter is rotated.

The primary object of the invention is to provide a sharpening device of the above kind which embraces the desired qualities of simplicity and durability of construction as well as efficiency in operation.

Another object is to provide a sharpening device of the above kind adapted to be applied to the lower core and embracing adjustability whereby the device may be used upon lawn mowers of various standard sizes.

A further object of the invention is to provide a sharpening device for rotating cutting reels of lawn mowers embodying a sharpening element supporting frame, provided with simple and effective means for detachably mounting the same upon a lawn mower in an expeditious manner.

Other objects are to provide for the adjustment of the sharpening element relative to the cutting reel and to provide simple and effective means for rotating the cutting reel during the sharpening operation.

Still further objects will become apparent as the nature of the invention is better understood, and the same consists in the novel form, combination and arrangement of parts hereinafter more fully described, shown in the accompanying drawings and claimed.

In the drawing, wherein like reference characters indicate corresponding parts throughout the several views:

Figure 1 is a view partly in top plan and partly in section, showing a sharpening device constructed in accordance with the present invention operatively associated with the lawn mower whose cutting reel is to be sharpened.

Figure 2 is a longitudinal sectional view taken substantially upon the line 2—2 of Figure 1.

Figure 3 is an enlarged transverse sectional view, taken on the line 3—3 of Figure 1.

Figure 4 is a longitudinal sectional view, taken on the line 4—4 of Figure 1.

Figure 5 is an enlarged perspective view of the sharpening element holder, and

Figure 6 is a fragmentary perspective view of the sharpening element.

Referring more in detail to the drawings, 5 indicates the rotating cutting reel of a lawn mower that includes a frame 6, between the side members of which the cutting reel 5 is disposed, said reel being provided with end shafts, one of which is indicated at 7 in Figure 1. These shafts extend outwardly thru the side members of the frame 6 and have a single pinion mounted thereon in a well known manner to engage the internal gear teeth of the adjacent traction wheel 9, whereby, upon forward movement of the lawn mower, the cutting reel is rotated in one direction, and whereby, upon rearward movement of the lawn mower, the cutting reel is allowed to remain still. This type of lawn mower therefor provides for a central cut between the co-axial traction wheels 9 and for causing travelling movement of the lawn mower, the latter is provided with a suitable rearwardly extending handle 10 that is pivotally connected to the frame 6 at its forward lower end in a well known manner, by means including diverging arms 11 bolted thereto. The present invention embodies a sharpener particularly adaptable for use upon lawn mowers of this well known type.

The sharpening device consists of a U-shaped frame 12 having legs that are adjustable in length and which are provided with means as suitably indicated at 13 at their forward free ends for substantial engagement with the transverse brace bar 14 of the lawn mower, which brace rod connects the forward ends of the side members of the mower frame 6 as shown clearly in Figures 1 and 2. The frame 12 is adapted to be disposed above the cutting reel 5 and above the handle 10 so that the central transverse portion of said frame extends across the handle 10, and the legs of the frame extend forwardly above the cutting reel.

The frame 12 is preferably constructed of three pipe sections 15, 16, and 17 that are joined, by means of elbows 18, so that the pipe section 16 forms the intermediate transverse member of the frame, and the pipe sections 15 and 17 form the inner sections of the legs of the frame. The outer sections of the frame legs consist of rods or bars 19, whose inner ends are threaded as at 20 for being threaded into the forward ends of the sections 15 and 17, so that the legs are made adjustable in length, as above noted, the forward free ends of the rods 19 being of hook shape to provide the means 13 for detachably engaging the transverse brace rod 14 of the lawn mower.

In order to prevent accidental displacement of the frame from the lawn mower, the hooks 13 are provided with set screws as at 21, arranged to impinge the rear side of the brace rod 14 as shown clearly in Figure 2, and threaded through the hooks 13 for this purpose.

The intermediate transverse member 16 of the frame 12 may be formed in two pieces adjustably coupled by means of a T-fitting 22 having the depending branch 23 that overlies the handle 10 and in which is threaded one end of a U-beam clamp 24 that is shaped to partially embrace the handle 10, and that is provided at its free end with a transverse set screw 25, arranged to impinge against the under side of the handle 10, whereby the rear end of the frame is detachably mounted upon the handle and effectively held against lateral or vertical displacement when in use.

The forward ends of the inner leg sections 15 and 17 are externally threaded and disposed through openings in the upper ends of depending bars 26, the lower ends of which are suitably attached to a transversely extending sharpening element holder or supporting bar 27. A pair of nuts 28 are threaded upon the forward end of each leg section 15 and 17 at opposite sides of the bar 26 carried thereon. This provides means whereby the bars 26 and the sharpening element supported thereby may be adjusted longitudinally of the leg and effectively maintained in adjusted position.

The holder 27 is preferably formed with angle iron with the vertical rear flange thereof attached to the lower end of the bar 26 and provided with a pair of openings as at 29 for selective reception of a bolt 30 that is adapted to pass through one of the openings 31 in the sharpening element 32 for securing the latter to the holder. The openings 31 extend through the sharpening element at right angles to each other and in different transverse planes, and provides means for attaching the sharpening element to the holder, so that all surfaces of said sharpening element may be used. In other words, the sharpening element 32 consists of a bar preferably of substantially rectangular cross section and having all four sides thereof adapted to act as a sharpening surface for engagement with the knives of the cutting reel, and so that a sharpening operation will be had no matter which surface of the sharpening element is presented to the knives, the provision of the openings 29 and 31 permitting the sharpening elements to be positioned for presenting any desired surface thereof to the knives. Also, the sharpening element is sufficiently long to extend from end to end of the knives for thereby sharpening the latter from end to end without requiring any transverse movement of the sharpener in operation.

Means is provided for rotating the cutting reel 5 in the direction of the arrow "a" (Figure 2) during the sharpening operation, or reversely to the direction in which said reel is rotated when the lawn mower is used for mowing purposes. This means embodies a suitable support 33 that is preferably of U-shape as shown, and in the sides of which are journalled a pair of transverse shafts 34 and 35. The shaft 34 has a crank handle 36 upon one end thereof for facilitating manual rotation of the same, and a relatively large gear 37 is fixed upon the central portion of the shaft 34 between the sides of the support 33. A pinion 38 is fixed upon the shaft 35 between the sides of the support 33 and in mesh with the gear 37, and one end of the shaft 35 projects through the opposite sides of the support 33 from that adjacent which the handle 36 is positioned, and has a socket for reception of the adjacent shaft 7 of the cutting reel. The shaft 7 is adapted to be disposed in the socket of the shaft 35 after the pinion has been removed from said shaft 7, and the shafts 7 and 35 are coupled in any desired manner, such as by means of a cross pin as shown in Figure 1, extending through aligned openings in said shaft. By means of this construction, the handle 36 may be turned toward the left of Figure 1 for rotating the cutting reel 5 in the direction of the arrow "a" and as rotation of the arrow in this direction is freely admitted by the pinion at the opposite side of the lawn mower, it is only necessary to remove one pinion to use the device.

It is thus apparent that as the knives of the reel 5 successively engage the adjacent surface of the sharpening element 32, said knives will be effectively sharpened within a short period of time.

It is believed that the operation and advantages of the device will be readily understood and appreciated by those skilled in the art from the foregoing description, and minor changes may be made, without departing from the spirit and scope of the invention as claimed.

What I claim as new is:

1. In a sharpening device for the knives of a rotating lawn mower cutting reel, a frame having means engageable with the cross brace and handle of the lawn mower for detachably mounting said frame above said handle and the cutting reel, a sharpening element holder suspended from said frame at the rear of the reel, said frame being of U-shape in plan with the leg thereof extending parallel with the opposite sides of said handle when operatively disposed upon the lawn mower and embodying leg members adjustable in length.

2. In a sharpening device for the knives of a rotating lawn mower cutting reel, a frame having means engageable with the cross brace and handle of the lawn mower for detachably mounting said frame above said handle and the cutting reel, a sharpening element holder suspended from said frame at the rear of said reel, said frame being of U-shape in plan with the leg thereof extending parallel with the opposite sides of said handle when operatively disposed upon the lawn mower and embodying leg members adjustable in length, and means for facilitating adjustment of the sharpening element holder longitudinally of the frame leg.

3. In a sharpening device for the knives of a rotating lawn mower cutting reel, a frame having means engageable with the cross brace and handle of the lawn mower for detachably mounting said frame above said handle and the cutting reel, a sharpening element holder suspended from said frame at the rear of the reel, said frame being of U-shape in plan with the leg thereof extending parallel with the opposite sides of said handle when operatively disposed upon the lawn mower and embodying leg members adjustable in length, the means for detachably welding the frame upon the lawn mower comprising hook members upon the forward ends of the frame legs engageable over the cross brace of the lawn mower forwardly of the cutting reel and a U-clamp carried by the rear end of the frame and engageable with the lawn mower handle.

4. In a sharpening device for the knives of a rotating lawn mower cutting reel, a frame having means engageable with the cross brace and handle of the lawn mower for detachably mounting said frame above said handle and the cutting reel, a sharpening element holder suspended from said frame at the rear of the reel, said sharpening element holder comprising depending bars connected at their lower end by a transverse angle bar, means for detachably securing a sharpening bar to said angle bar in position to engage the knives of the cutting reel and for permitting presentation of any desired face of the sharpening bar to said knives.

In testimony whereof I affix my signature.

JOHN L. SPURGEON.